United States Patent
Zhao et al.

(10) Patent No.: US 11,895,626 B2
(45) Date of Patent: Feb. 6, 2024

(54) RESOURCE ALLOCATION METHOD AND TERMINAL DEVICE

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 400 days.

(21) Appl. No.: 17/356,441

(22) Filed: Jun. 23, 2021

(65) Prior Publication Data

US 2021/0329606 A1    Oct. 21, 2021

Related U.S. Application Data

(63) Continuation of application No. PCT/CN2018/123504, filed on Dec. 25, 2018.

(51) Int. Cl.
*H04W 72/04* (2023.01)
*H04L 1/08* (2006.01)
(Continued)

(52) U.S. Cl.
CPC ............ *H04W 72/04* (2013.01); *H04L 1/08* (2013.01); *H04L 5/0055* (2013.01); *H04W 4/40* (2018.02)

(58) Field of Classification Search
CPC ....... H04L 1/08; H04L 1/1822; H04L 1/1887; H04L 5/0055; H04L 5/0094; H04W 4/40; H04W 72/04
See application file for complete search history.

(56) References Cited

U.S. PATENT DOCUMENTS

2018/0077695 A1    3/2018 Hwang et al.
2020/0106500 A1*   4/2020 Noh .................. H04B 7/0621

FOREIGN PATENT DOCUMENTS

CN    105430751    3/2016
CN    107734704    2/2018
(Continued)

OTHER PUBLICATIONS

WIPO, International Search Report and Written Opinion for PCT/CN2018/123504, dated Sep. 24, 2019.

*Primary Examiner* — Nader Bolourchi
(74) *Attorney, Agent, or Firm* — Hodgson Russ LLP

(57) ABSTRACT

Embodiments of the present application relate to a resource allocation method and a terminal device. The method comprises: a first terminal device allocates a first resource to a second terminal device, the first resource being used for sending sidelink data to a third terminal device by the second terminal device; the first terminal device determines whether feedback information sent by a target terminal device is received, the target terminal device being the second terminal device and/or the third terminal device, and the feedback information being used for indicating whether the third terminal device successfully receives the sidelink data; and the first terminal device determines, according to whether the feedback information is received, whether to allocate a second resource to the second terminal device, the second resource being used for resending the sidelink data to the third terminal device by the second terminal device.

20 Claims, 4 Drawing Sheets

(51) Int. Cl.
*H04W 4/40* (2018.01)
*H04L 5/00* (2006.01)

(56) References Cited

FOREIGN PATENT DOCUMENTS

| | | |
|---|---|---|
| CN | 108810906 | 11/2018 |
| WO | 2017150955 | 9/2017 |
| WO | 2018010436 | 1/2018 |

* cited by examiner

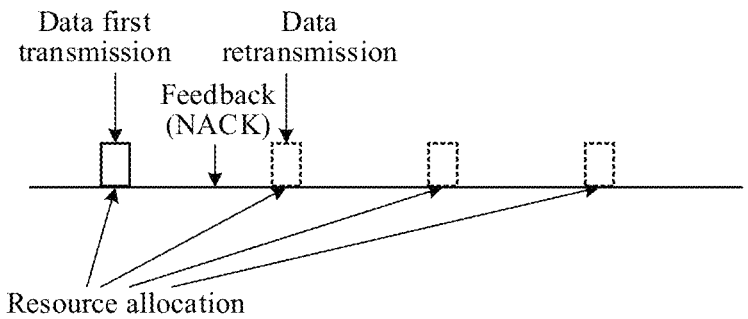
Fig. 4
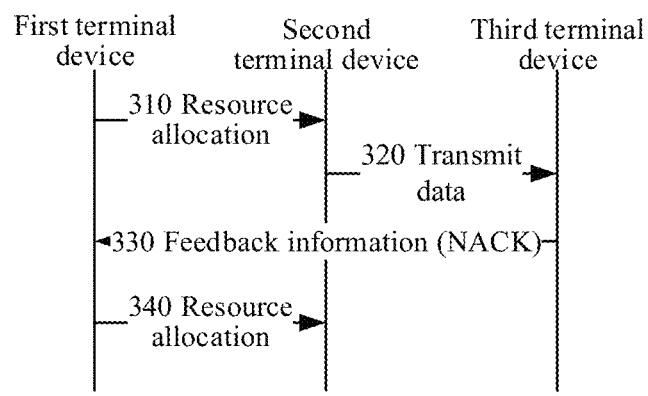
Fig. 5
Fig. 6

RESOURCE ALLOCATION METHOD AND TERMINAL DEVICE

CROSS-REFERENCE TO RELATED APPLICATION

This application is a continuation of International Application No. PCT/CN2018/123504, filed Dec. 25, 2018, the entire disclosure of which is incorporated herein by reference.

TECHNICAL FIELD

The present application relates to the field of communications, and more particularly, to a method of resource allocation and a terminal device.

BACKGROUND

In a New Radio (NR) vehicle to everything (V2X) system, considering the need to support autonomous driving, higher requirements are put forward on data interaction between vehicles, such as higher throughput, a lower delay, higher reliability, a larger coverage area and more flexible resource allocation, etc.

Therefore, in a NR-V2X system, it is necessary that various transmission manners are supported, such as unicast, groupcast and broadcast; meanwhile, multiple transmission modes are also introduced.

In NR-V2X, in addition to the mode in which a network device allocates a sidelink transmission resource and the mode in which a terminal device autonomously selects a sidelink transmission resource, other resource allocation manner is also introduced, for example, the terminal device allocates a transmission resource to another terminal device. For example, in groupcast communication, one terminal device serves as a group head and other terminal device serves as a group member, at this time, the group head may allocate a sidelink transmission resource to the group member. In one group, the group head may allocate a transmission resource to the group member, where the transmission resource is used for performing data transmission between the group member and the group head; and the transmission resource may also be used for performing data transmission between the group member and another group member.

In the manner in which the terminal device allocates a transmission resource to another terminal, for example, for performing sidelink communication between a terminal device 2 and a terminal device 3, a terminal device 1 may allocate a transmission resource to the terminal device 2 or the terminal device 3, and when an error occurs in the communication between the terminal device 2 and the terminal device 3, how the terminal device 1 allocates a retransmission resource is a problem urgent to be solved.

SUMMARY

The embodiments of the present application provide a method of resource allocation and a terminal device, which can realize the allocation of a retransmission resource in the case that the terminal device allocates a transmission resource to another terminal device.

In a first aspect, there is provided a method of resource allocation, including: allocating, by a first terminal device, a first resource to a second terminal device, where the first resource is used for transmitting sidelink data to a third terminal device by the second terminal device; determining, by the first terminal device, whether feedback information sent by a target terminal device is received, where the target terminal device is the second terminal device and/or the third terminal device, and where the feedback information is used for indicating whether the third terminal device successfully receives the sidelink data; and determining, by the first terminal device, whether to allocate a second resource to the second terminal device according to whether the feedback information is received, where the second resource is used for retransmitting the sidelink data to the third terminal device by the second terminal device.

In a second aspect, there is provided a method of resource allocation, including: receiving, by a second terminal device, a first resource allocated by a first terminal device; transmitting, by the second terminal device, sidelink data to a third terminal device using the first resource; and when the second terminal device determines that the third terminal device does not successfully receive the sidelink data, sending, by the second terminal device, negative acknowledgement (NACK) information to the first terminal device, where the NACK information is used for instructing the first terminal device to allocate a second resource to the second terminal device.

In a third aspect, there is provided a method of resource allocation, including: receiving, by a third terminal device, sidelink data transmitted by a second terminal device through a first resource, where the first resource is allocated by a first terminal device to the second terminal device; and sending, by the third terminal device, feedback information to the second terminal device or the first terminal device according to whether the sidelink data is successfully received, where the feedback information is used for indicating whether the third terminal device successfully receives the sidelink data and is used for determining by the first terminal device whether to allocate a second resource to the second terminal device.

In a fourth aspect, there is provided a terminal device, configured to perform the method in the foregoing first aspect or in various implementations thereof. Specifically, the terminal device includes a functional module configured to perform the method in any of the foregoing first aspect to third aspect or in various implementations thereof.

In a fifth aspect, there is provided a terminal device, including a processor and a memory. The memory is configured to store a computer program, and the processor is configured to call and run the computer program stored in the memory so as to perform the method in any of the foregoing first aspect to third aspect or in various implementations thereof.

In a sixth aspect, there is provided a chip, configured to implement the method in any of the foregoing first aspect to second aspect or in various implementations thereof. Specifically, the chip includes: a processor, configured to call and run a computer program from a memory, so that a device installed with the chip performs the method in any of the foregoing first aspect to third aspect or in various implementations thereof.

In a seventh aspect, there is provided a computer-readable storage medium for storing a computer program, where the computer program causes a computer to perform the method in any of the foregoing first aspect to third aspect or in various implementations thereof.

In an eighth aspect, there is provided a computer program product, including a computer program instruction, where the computer program instruction causes a computer to perform the method in any of the foregoing first aspect to third aspect or in various implementations thereof.

In a ninth aspect, there is provided a computer program, where when the computer program is run on a computer, the computer is caused to perform the method in any of the foregoing first aspect to third aspect or in various implementations thereof.

Based on the foregoing technical solutions, the first terminal device allocates the first resource to the second terminal device, the second terminal device transmits sidelink data to the third terminal device using the first resource, and the first terminal device can determine whether to allocate the second resource to the second terminal device according to the situation that the third terminal device receives the sidelink data, where the second resource is used for retransmitting the sidelink data to the third terminal device by the second terminal device, thereby achieving allocation of the retransmission resource of the sidelink data.

BRIEF DESCRIPTION OF THE DRAWINGS

FIG. 4 is a schematic diagram of a method of resource allocation provided by an embodiment of the present application.

FIG. 5 is a schematic flow chart of another method of resource allocation provided by an embodiment of the present application.

FIG. 6 is a schematic diagram of a method of resource allocation provided by an embodiment of the present application.

DETAILED DESCRIPTION

The technical solutions in the embodiments of the present application will be described below in conjunction with the accompanying drawings in the embodiments of the present application. Obviously, the embodiments described are part of embodiments of the present application, rather than all the embodiments. Based on the embodiments in the present application, all other embodiments obtained by those of ordinary skilled in the art without creative work fall within the protection scope of the present application.

The technical solutions of the embodiments of the present application may be applied to various communication systems, for example, a Global System of Mobile communication (GSM), a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a 5G system, etc.

Figure 1:
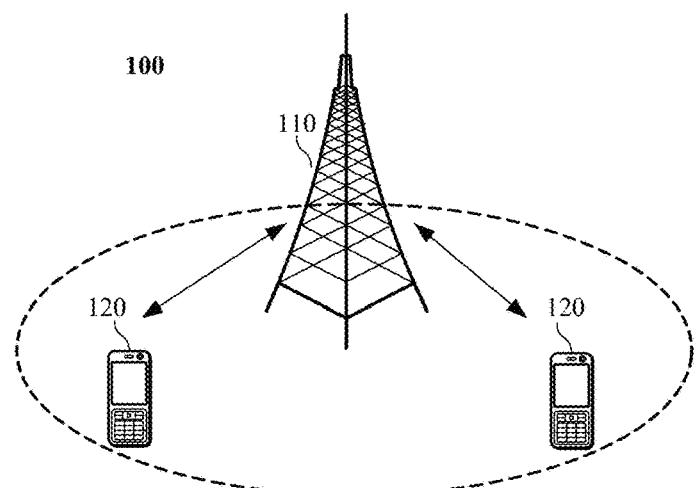
FIG. 1 is a schematic diagram of a communication system architecture provided by an embodiment of the present application.

Exemplarily, a communication system 100 applied in the embodiments of the present application is as shown in FIG. 1. The communication system 100 may include a network device 110, and the network device 110 may be a device which communicates with a terminal device 120 (or referred to as a communication terminal or a terminal). The network device 110 may provide communication coverage for a specific geographic area, and may communicate with a terminal device located within the coverage area. Optionally, the network device 110 may be a Base Transceiver Station (BTS) in a GSM or a CDMA system, a NodeB (NB) in a WCDMA system, an Evolutional Node B (eNB or eNodeB) in an LTE system or a wireless controller in a Cloud Radio Access Network (CRAN). Or the network device may be a mobile switching center, a relay station, an access point, an in-vehicle device, a wearable device, a hub, a switch, a bridge, a router, a network side device in a 5G network or a network device in a future evolved Public Land Mobile Network (PLMN), etc.

The communication system 100 also includes at least one terminal device 120 located within the coverage area of the network device 110. As used hereby, the "terminal device" includes, but not limited to: a connection via a wired line, such as a connection via Public Switched Telephone Networks (PSTN), a Digital Subscriber Line (DSL), a digital cable, a direct cable; and/or another data connection/network; and/or an interface via wireless, such as a transmitter for a cellular network, a Wireless Local Area Network (WLAN), a digital TV network such as a DVB-H network, a satellite network, an AM-FM broadcast; and/or an apparatus of another terminal device set to receive/send a communication signal; and/or an Internet of Things (IoT) device. The terminal device set to communicate through a wireless interface may be referred to as a "wireless communication terminal", a "wireless terminal" or a "mobile terminal". Examples of the mobile terminal include, but not limited to: a satellite or cellular telephone; a Personal Communications System (PCS) terminal which may combine a cellular radio telephone with capabilities of data processing, faxing and data communication; a PDA which may include a radio telephone, a pager, internet/intranet access, a web browser, a notebook, a calendar, and/or a Global Positioning System (GPS) receiver; and a conventional laptop and/or palmtop receiver or other electronic apparatus including a radio telephone transceiver. The terminal device may refer to an access terminal, User Equipment (UE), a user unit, a user station, a mobile station, a mobile platform, a remote station, a remote terminal, a mobile device, a user terminal, a terminal, a wireless communication device, a user agent or a user apparatus. The access terminal may be a cellular telephone, a cordless telephone, a Session Initiation Protocol (SIP) telephone, a Wireless Local Loop (WLL) station, a Personal Digital Assistant (PDA), a wireless communication functional handheld device, computing device or other processing device connected to a wireless modem, an in-vehicle device, a wearable device, a terminal device in a 5G network or a terminal device in a future evolved PLMN, etc.

Optionally, Device to Device (D2D) communication may be performed between the terminal devices 120.

Optionally, a 5G system or a 5G network may also be referred to as a New Radio (NR) system or a NR network.

FIG. 1 exemplarily shows one network device and two terminal devices. Optionally, the communication system 100 may include a plurality of network devices, and other number of terminal devices may be included within the coverage area of each network device, which is not limited by the embodiments of the present application.

Optionally, the communication system 100 may also include other network entity such as a network controller, a mobile management entity and the like, which is not limited by the embodiments of the present application.

It should be understood that the device with a communication function in the network/system in the embodiments of the present application may be referred to as a communication device. Taking the communication system 100 shown in FIG. 1 as an example, the communication device may include a network device 110 and a terminal device 120 with the communication function, and the network device 110 and the terminal device 120 may be the specific devices described above, which is not elebrated here; the communication device may also include other device in the communication system 100, for example, other network entity such as a network controller, a mobile management entity and the like, which is not limited in the embodiments of the present application.

It should be understood that the terms "system" and "network" herein are often used interchangeably herein. The term "and/or" herein is only to describe a kind of association relationship among associated objects, and means that there may be three kinds of relationships. For example, A and/or B, may mean that there are the following three cases: A exists alone, A and B exist at the same time, and B exists alone. In addition, the character "/" herein generally indicates that the associated objects before and after are in an "or" relationship.

Figure 2:
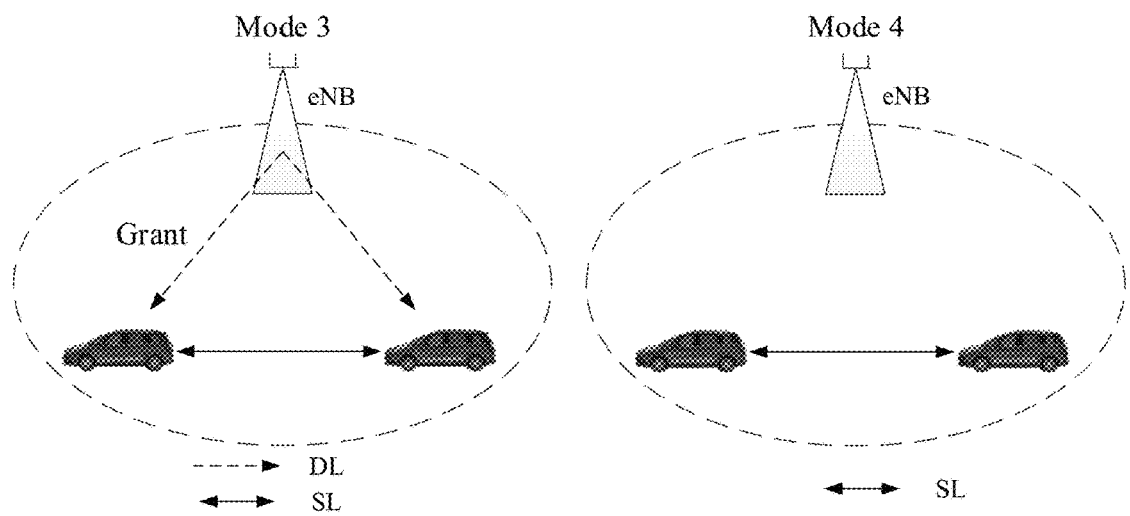
FIG. 2 is a schematic diagram of a sidelink resource allocation manner provided by an embodiment of the present application.

In Release 14 (Rel-14) of 3GPP, V2X is standardized and two transmission modes are defined: mode 3 and mode 4. FIG. 2 shows a schematic diagram of two transmission modes in a vehicle to everything system according to the embodiments of the present application.

As shown in FIG. 2, the mode 3 on the left shows: a transmission resource of vehicle terminal is allocated by a base station through a downlink (DL), and the vehicle terminal sends data on a sidelink (SL) according to the resource allocated by the base station; and the base station may allocate a resource of single transmission to the terminal, or allocate a resource of semi-static transmission to the terminal.

As shown in FIG. 2, the mode 4 on the right shows: vehicle terminal uses a transmission manner of sensing and reservation. The vehicle terminal obtains an available transmission resource set in a resource pool through the manner of sensing, and the terminal randomly selects one resource from the set for transmission of data. Since the service in the vehicle to everything system has periodic features, the terminal often uses a manner of semi-static transmission, i.e. after the terminal selects one transmission resource, the terminal will continuously use the resource in multiple transmission cycles, thereby reducing the probability of resource reselection and resource collision. The terminal may carry information of reserving next transmission resource in control information of the present transmission, so that other terminal(s) may determine through detecting the control information of the user whether this resource is reserved and used by the user, thereby achieving the purpose of reducing resource collision. In mode 4, the vehicle terminal may be located within the coverage area of the network or outside the coverage area of the network.

In the NR-V2X system, considering the need to support autonomous driving, higher requirements are put forward on data interaction between vehicles, such as higher throughput, a lower delay, higher reliability, a larger coverage area and more flexible resource allocation, etc.

Therefore, in the NR-V2X system, various transmission manners need to be supported, such as unicast, groupcast and broadcast; meanwhile, multiple transmission modes are also introduced.

In NR-V2X, in addition to a similar mode to the foregoing mode 3 (the network device allocating a sidelink transmission resource) and mode 4 (the terminal device autonomously selecting a sidelink transmission resource), other resource allocation manner is also introduced, for example, the terminal device allocating a transmission resource to another terminal device. For example, in groupcast communication, one terminal device serves as a group head, and other terminal device(s) serves as a group member(s), at this time, the group head may allocate a sidelink transmission resource to the group member. In one group, the group head may allocate a transmission resource to the group member, where the transmission resource is used for performing data transmission between the group member and group head; and the transmission resource may also be used for performing data transmission between the group member and another group member.

Figure 3:
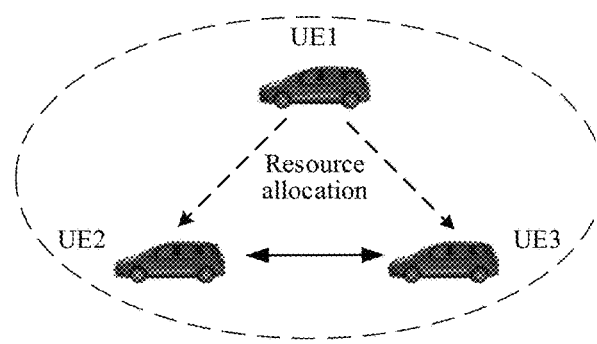
FIG. 3 is a schematic diagram of another sidelink resource allocation manner provided by an embodiment of the present application.

Taking FIG. 3 as an example, in a manner in which the terminal device allocates a transmission resource to another terminal device, for any three terminal devices in one group, for example, UE 1, UE 2 and UE 3 in FIG. 3, it is assumed that the UE 1 is a group head, and the UE 2 and the UE 3 are group members here. The group head represents a terminal device with a function such as resource management, resource control, resource allocation or the like. The communication between the UE 2 and the UE 3 is illustrated as an example here. The UE 1 may allocate a sidelink transmission resource to the UE 2 or the UE 3, for example, the UE 1 may allocate the sidelink transmission resource to the UE 2, and the sidelink transmission resource is used for transmitting data to the UE 3 by the UE 2. However, when an error occurs in the communication between the UE 2 and the UE 3, how does the UE 1 allocate the retransmission resource?

Therefore, a method of resource allocation is proposed by the embodiments of the present application, which can solve the foregoing problem of how to allocate the retransmission resource.

In the embodiments of the present application, for ease of illustration, it is illustrated here as an example that a first terminal device allocates a first resource to a second terminal device, where the first resource is used for transmission of sidelink data, i.e. the first terminal device allocates the first resource to the second terminal device, and the second terminal device may perform sidelink communication with another terminal device using the first resource.

The first terminal device and the second terminal device may be any two terminal devices, where the first terminal device or the second terminal device may be any one of the terminal devices as shown in FIG. 1 and FIG. 2; or the first terminal device may be the UE 1 as shown in FIG. 1 and the second terminal device may be the UE 2 or the UE 3 as shown in FIG. 3, which is not limited by the embodiments of the present application.

In addition, the first terminal device and the second terminal device may be located in the same group, for example, the first terminal device may be the group head in the group for allocating a transmission resource for the group members in the group, and the second terminal device is any one of the group members in the group.

The first resource allocated by the first terminal device to the second terminal device may be used for performing sidelink communication between the second terminal device and another terminal device. It is illustrated here as an example that the second terminal device transmits sidelink data to a third terminal device using the first resource. The third terminal device may be any one of the terminal devices as shown in FIG. 1 and FIG. 2; or the third terminal device may be the UE 2 or the UE 3 as shown in FIG. 3. The third terminal device may be located in the same group as the second terminal device, or may not be located in the same group, which is not limited by the embodiments of the present application.

It should be understood that in the embodiments of the present application, the second terminal device transmits sidelink data to the third terminal device using the first resource allocated by the first terminal device, where the sidelink data may include Sidelink Control Information (SCI) and service data (data), which is not limited by the embodiments of the present application. The SCI is used for carrying control information of the service data, for example, the SCI may include following information: a time-frequency resource used to transmit the service data, an MSC level and priority information, etc.

In the embodiments of the present application, FIG. 4 shows a schematic diagram of a method of resource allocation provided by an embodiment of the present application. As shown in FIG. 4, when a first terminal allocates a transmission resource to a second terminal, a plurality of the transmission resources may be located, and a first transmission resource is included in the plurality of transmission resources, i.e. the solid-line block in FIG. 4; and resources used to retransmit N-1 times are also included, i.e. the dashed-line blocks in FIG. 4.

For ease of illustration, the first transmission resource among the plurality of transmission resources is referred to as a first resource, and the resources for N-1 times of transmission are referred to as a second resource. As shown in FIG. 4, a first allocated resource is often set as the first transmission resource, i.e. the first resource, and subsequent resources are set as retransmission resources, i.e. the second resource, which is not limited by the embodiments of the present application.

The second terminal device obtains the plurality of transmission resources, and performs data transmission using the first resource therein. As shown in FIG. 4, it is assumed that the first resource is the first allocated transmission resource. When an error occurs during receiving by a third terminal device as the receiving end, for example, as shown in FIG. 4, the third terminal device feeds back negative acknowledgement (NACK) information, or in the case that the third terminal device does not send acknowledgment (ACK) information, the second terminal device may determine that the third terminal device fails to receive the sidelink data and may use the second resource among a plurality of the transmission resources to perform retransmission. For example, retransmission of the sidelink data may continue to be performed using the second allocated transmission resource and the subsequent transmission resources, until receiving by the third terminal device is successful. For example, the third terminal device may send the ACK information to the second terminal device, so that the second terminal device determines that receiving by the third terminal device is successful and stops retransmission; or when the number of retransmissions by the second terminal device reaches the maximum retransmission number, retransmitting the sidelink data to the third terminal device is stopped.

Therefore, the first terminal device allocates a plurality of transmission resources to the second terminal device for the first transmission and the data retransmission between the second terminal device and the third terminal device, which solves the problem of resource allocation of retransmission of the sidelink data between the terminal devices.

Optionally, the number of the transmission resources allocated by the first terminal device to the second terminal device is determined according to preconfiguration information, or is determined according to network configuration information, or is autonomously determined by the first terminal device, or is determined by the first terminal device according to attribute information of the sidelink data to be sent by the second terminal device. For example, the attribute information may include at least one of following information: a delay requirement of the sidelink data, Quality of Service (QoS) of the sidelink data, a QoS Class Identifier (QCI), a vehicle to everything 5G QoS Identifier (VQI) value and a priority of the sidelink data, which is not limited by the embodiments of the present application.

Optionally, FIG. 5 shows a schematic flow chart of a method of resource allocation 200 according to another embodiment of the present application. As shown in FIG. 5, the method 200 includes: S210, a first terminal device allocating a first resource to a second terminal device, where the first resource is used for transmitting sidelink data to a third terminal device by the second terminal device; S220, the first terminal device determining whether feedback information sent by a target terminal device is received, where the target terminal device is the second terminal device and/or the third terminal device, and where the feedback information is used for indicating whether the third terminal device successfully receives the sidelink data; and S230, the first terminal device determining whether to allocate a second resource to the second terminal device according to whether the feedback information is received, where the second resource is used for retransmitting the sidelink data to the third terminal device by the second terminal device.

Specifically, in S210, the first terminal device allocates the first resource to the second terminal device, and the second terminal device transmits the sidelink data to the third terminal device using the first resource, where the sidelink data may include SCI and service data. When receiving the sidelink data, the third terminal device may give different feedback to the first terminal device or the second terminal device according to different reception conditions.

For example, if the third terminal device successfully receives the sidelink data, the third terminal device may feed back ACK information; if the third terminal device does not successfully detect the SCI, the third terminal device does not know that there is the data sent and will not send the feedback information, which may be referred to as a Discontinuous Transmission (DTX) state; and if the third terminal device successfully detects the SCI, however an error occurs when the third terminal device is receiving the data, the third terminal device may feed back NACK information, where the NACK information indicates that the third terminal device fails to receive the sidelink data.

In S220, the first terminal device may determine whether the feedback information sent by the target terminal device is received, where the target terminal device may be the second terminal device or the third terminal device, and where the feedback information is used for indicating whether the third terminal device successfully receives the sidelink data; and thus in S230, the first terminal device determines whether to allocate the second resource to the second terminal device according to whether the feedback information is received, or according to whether the third terminal device successfully receives the sidelink data indicated in the feedback information, where the second resource may be used for retransmitting the sidelink data to the third terminal device by the second terminal device, or the second resource may be used for the sidelink transmission between the second terminal device and another terminal device, which is not limited by the embodiments of the present application.

It should be understood that the target terminal device in the embodiment of the present application may be the second terminal device and/or the third terminal device. When the target terminal device is the third terminal device, the third terminal device sends the feedback information to the first terminal device directly according to whether the sidelink data sent by the second terminal device is correctly received, without the feedback information being forwarded by the second terminal device, thereby reducing the signaling overhead and reducing the delay. When the target terminal device is the second terminal device, the second terminal device forwards initial feedback information sent by the third terminal device to the first terminal device without the sidelink data transmission between the third terminal device and the first terminal device. For example, the third terminal device is outside a transmission range of the first terminal device, and the second terminal device is within the transmission range of the first terminal device, therefore the second terminal device forwards the initial feedback information of the third terminal device without the sidelink data transmission between the third terminal device and the first terminal device.

For ease of illustration, it will be described as examples below that the target terminal devices are the second terminal device and the third terminal device respectively.

Optionally, as the first embodiment, when the target terminal device is the third terminal device, the first terminal device determines whether feedback information sent by the third terminal device is received, and then determines whether to allocate the second resource to the second terminal device. The embodiment will be described below in detail in conjunction with FIG. 6.

FIG. 6 shows a schematic diagram of a method of resource allocation provided by an embodiment of the present application. As shown in FIG. 6, in S310 of resource allocation, the first terminal device sends the first resource to the second terminal device. This step is identical to S210, which is not repeatedly described here.

In S320, data is sent, i.e. the second terminal device sends sidelink data to the third terminal device using the first resource. Specifically, the third terminal device may receive the service data in the sidelink data according to the detected SCI in the sidelink data.

In S330, information is fed back. The third terminal device sends feedback information to the first terminal device according to reception condition of the sidelink data.

If the third terminal device determines to send the feedback information, the feedback information may be sent to the first terminal device through a first sidelink channel, and the first sidelink channel may be a Physical Sidelink Control Channel (PSCCH), a Physical Sidelink Shared Channel (PSSCH) or a Physical Sidelink Feedback Channel (PSFCH).

Optionally, if the third terminal device successfully receives the sidelink data, the feedback information sent by the third terminal device to the first terminal device may be used for indicating that the third terminal device successfully receives the sidelink data. For example, the feedback information may be ACK information; or in the case that the third terminal device successfully receives the sidelink data, the feedback information is not sent.

If the third terminal device does not successfully detect the SCI in the sidelink data, the third terminal device does not know that there is the service data sent, and will not send the feedback information to the first terminal device.

If the third terminal device successfully detects the SCI, however an error occurs when receiving the service data, the third terminal device may send the feedback information to the first terminal device, where the feedback information is used for indicating that the third terminal device fails to receive the sidelink data. For example, the feedback information may NACK information.

Optionally, the third terminal device sends the feedback information to the first terminal device, and may also send a first indication message to the first terminal device. For example, the first indication message may include at least one of following information: identification information of the third terminal device, identification information of the second terminal device, link identification information of a link between the second terminal device and the third terminal device, group identification information, Hybrid Automatic Repeat request (HARQ) process information, Sidelink Channel State Information (S-CSI), Sidelink Channel Quality Indication (S-CQI), path loss information of the link between the second terminal device and the third terminal device, Sidelink Reference Signal Received Power (S-RSRP) information and power indication information.

The identification information of the third terminal device may be a Radio Network Temporary Identity (RNTI) of the third terminal device. Likewise, the identification information of the second terminal device may also be an RNTI of the second terminal device. The group identification information may be a group identity of a group in which all or part of the terminal devices among the first terminal device, the second terminal device and the third terminal device are located. For example, assuming that the first terminal device and the second terminal device belong to a same group, when the second terminal device and the third terminal device belong to the same group, the identity of the group in which the second terminal device is located may be included in the first indication message; and when the second terminal device and the third terminal device do not belong to the same group, the identity of the group in which the second terminal device is located may be included in the first indication message, or the identity of the group in which the third terminal device is located may be included in the first indication message. The HARQ process information is HARQ process information of transmitting the sidelink data between the second terminal device and the third terminal device. The S-CSI and the S-CQI are S-CSI and S-CQI between the second terminal device and the third terminal device. The power indication information may be power offset information or power adjustment information for indicating the power adjustment when the second terminal device sends the sidelink data, which is not limited by the embodiments of the present application.

Optionally, the feedback information and the first indication message may be carried in a same sidelink channel, or be carried in different sidelink channels. For example, the third terminal device sends the first sidelink channel to the first terminal device, such as a PSFCH, and both the feedback information such as NACK and the identification information of the third terminal device are included in the PSFCH. For another example, the third terminal device sends the first sidelink channel to the first terminal device, such as a PSFCH, and the feedback information such as NACK, is included in the PSFCH. The second terminal device also sends a second sidelink channel to the first terminal device, such as a PSCCH, and the identification information of the second terminal device and the third terminal device is included in the PSCCH.

Optionally, the first indication message includes the identification information of the third terminal device for determining by the first terminal device by which terminal device the feedback information is sent.

Optionally, the first indication message includes the identification information of the second terminal device for indicating by which terminal device the sidelink data corresponding to the feedback information is sent to the third terminal device.

Optionally, the first indication message includes both the identification information of the third terminal device and the identification information of the second terminal device at the same time, where the identification information of the third terminal device and the identification information of the second terminal device are used for indicating that the feedback information is corresponding to the sidelink data sent by the second terminal device to the third terminal device. Further, the identification information of the third terminal device and the identification information of the second terminal device may indicate that the feedback information is sent by the third device.

Optionally, the first indication message includes the link identification information of the link between the second terminal device and the third terminal device, where the link identification information of the link between the second terminal device and the third terminal device is used for indicating that the feedback information is corresponding to the sidelink data sent by the second terminal device to the third terminal device.

Optionally, the first indication message includes the group identification information for indicating that the feedback information is corresponding to the sidelink data in the group. For example, the first terminal device may determine through other manner that the group includes the first terminal device, the second terminal device, and the third terminal device, and the first terminal device allocates to the second terminal device the transmission resource for transmitting the sidelink data to the third terminal device by the second terminal device. At this time, the first terminal device may determine according to the group identification information that the feedback information is corresponding to the sidelink data sent to the third terminal device by the second terminal device.

Optionally, the first indication message includes the S-CSI, or the S-CQI, or the path loss information of the link between the second terminal device and the third terminal device, or the S-RSRP or power indication information, for assisting the first terminal device to allocate the second resource and a corresponding transmission parameter to the second terminal device.

In S340, the resource is allocated. The first terminal device determines whether to allocate the second resource to the second terminal device, where the second resource may be used for retransmitting the sidelink data to the third terminal device by the second terminal device.

Optionally, when the first terminal device receives the feedback information, it may determine whether to allocate the second resource to the second terminal device according to the feedback information. Specifically, if the feedback information indicates that the third terminal device does not successfully receive the sidelink data, for example, the feedback information is NACK information, then the first terminal device allocates the second resource to the second terminal device; or if the feedback information indicates that the third terminal device successfully receives the sidelink data, for example, the feedback information is the ACK information, then the first terminal device does not allocate the second resource to the second terminal device.

Optionally, if the first terminal device does not receive the feedback information sent by the third terminal device, the first terminal device may not allocate the second resource to the second terminal device. For example, if the ACK information may not be sent when the third terminal device successfully receives the sidelink data, the first terminal device may determine that the third terminal device successfully receives the sidelink data and does not allocate the second resource to the second terminal device when the feedback information sent by the third terminal device is not received. Alternatively, considering that in the case that the third terminal device fails to detect the SCI, the feedback information is not sent, either, it may be set that the third terminal device sends the ACK information when the third terminal device successfully receives the sidelink data, and then when the first terminal device does not receive the feedback information sent by the third terminal device, or when a DTX state is determined by the first terminal device, the first terminal device allocates the second resource to the second terminal device; or the first terminal device may further determine through other manner whether to allocate the second resource to the second terminal device, which is not limited by the embodiments of the present application.

Optionally, the first terminal device may also determine whether to allocate a third resource to the second terminal device, where the third resource is used for transmitting new sidelink data to the third terminal device by the second terminal device, or the third resource is used for sidelink transmission between the second terminal device and another terminal device.

For example, the third terminal device successfully receives the sidelink data sent by the second terminal device; the third terminal device sends the ACK information to the first terminal device, the first terminal device determines that the third terminal device successfully receives the sidelink data sent by the second terminal device according to the ACK information; and the first terminal device may allocate the third resource to the second terminal device. The third resource is used for transmitting the new sidelink data to the third terminal device by the second terminal device; or the third resource is used for sidelink transmission between the second terminal device and another terminal device.

Optionally, as a second embodiment, when the target terminal device is the second terminal device, the first terminal device determines whether the feedback information of the second terminal device is received, and then determines whether to allocate a second resource to the second terminal device. The embodiment will be described below in detail in conjunction with FIG. 7.

Figure 7:
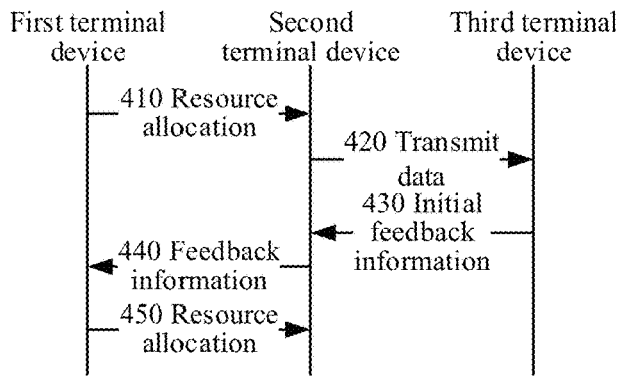
FIG. 7 is a schematic diagram of another method of resource allocation provided by an embodiment of the present application.

FIG. 7 shows a schematic diagram of another method of resource allocation provided by an embodiment of the present application. As shown in FIG. 7, in S410 of resource allocation, a first terminal device sends a first resource to a second terminal device. This step is identical to S210, and is not repeatedly described here.

In S420, data is sent, i.e. the second terminal device transmits sidelink data to a third terminal device using the first resource. This step is identical to S320, and is not repeatedly described here.

In S430 of initial feedback information, the third terminal device may send initial feedback information to the second terminal device according to reception condition of the sidelink data. If the third terminal device determines to send the initial feedback information, the initial feedback information may be sent to the second terminal device through a third sidelink channel, where the third sidelink channel may be a PSCCH, a PSSCH or a PSFCH.

Optionally, if the third terminal device successfully receives the sidelink data, the initial feedback information sent to the second terminal device by the third terminal device may be used for indicating that the third terminal device successfully receives the sidelink data, for example, the initial feedback information may be ACK information; and if the third terminal device does not successfully receive the sidelink data, for example, the third terminal device does not successfully detect SCI, the initial feedback information may not be sent to the second terminal device, for another example, if the third terminal device successfully detects SCI but an error occurs in data receiving, the initial feedback information sent to the second terminal device by the third terminal device may be used for indicating that the third terminal device does not successfully receive the sidelink data, for example, the initial feedback information may be NACK information.

It should be understood that, for the second terminal device, it may determine through several manners whether the initial feedback information is received. For example, a timer may be set in the second terminal device. When the second terminal device sends the sidelink data to the third terminal device, the timer is started, and the timer starts timing. The timer may perform timing in any time unit, for example, timing may be performed in the unit of slot. Every slot, the second terminal device detects whether the initial feedback information exists on the slot. If the second terminal device detects the initial feedback information in a current slot, the timer is stopped; and if the second terminal device does not detect the initial feedback information in a current slot, the timer is adjusted by a value 1 and a next slot is continued to be detected until the initial feedback information is detected; or if the initial feedback information is still not detected until the timer expires, the second terminal device determines that the initial feedback information is not received, and the timer is stopped.

Adjusting the timer by a value 1 includes increasing or decreasing by a value 1. For example, if the timer is a countdown timer, i.e. when the timer is started, the timer starts timing from preset duration, then adjusting by a value 1 means decreasing by a value 1. When the timer is 0, the timer expires. If the timer sequentially counts, i.e. when the timer is started, the timer starts timing from 0, then adjusting by value 1 means decreasing by value 1. When a count value of the timer reaches preset duration, the timer expires.

Optionally, the duration of the timer may be set according to an actual application, for example, may be determined by the second terminal device according to pre-configuration, network device configuration, or attribute information of the sidelink data. For example, the attribute information may include at least one of following information: a delay requirement of the sidelink data, QoS of the sidelink data, a QCI, a VQI value and a priority of the sidelink data, which is not limited by the embodiments of the present application.

For another example, the second terminal device may also detect on a preset feedback resource whether the third terminal device sends the initial feedback information. Specifically, the second terminal device sends the sidelink data to the third terminal device using the first resource, and the first resource may be corresponding to the preset feedback resource, where the preset feedback resource is used for transmitting the initial feedback information by the third terminal device. For example, the preset feedback resource may have a corresponding relationship with the first resource, and the second terminal device and the third terminal device determine the preset feedback resource according to the first resource, where the corresponding relationship may be pre-configuration, network device configuration or other terminal device configuration, for example, may be configured by the first terminal device; or when the first terminal device configures the first resource for the second terminal device, the preset feedback resource is also configured for the second terminal device and the third terminal device, which is not limited by the embodiments of the present application.

The second terminal device detects on the preset feedback resource whether the initial feedback information exists, and if the initial feedback information is not detected, it is determined that the third terminal device does not send the initial feedback information.

Optionally, the second terminal device may determine whether the initial feedback information is received combining the preset feedback resource and the timer. For example, when the second terminal device transmits the sidelink data to the third terminal device on the first resource, the timer is started and the timer starts timing. The second terminal device determines the feedback resource corresponding to the first resource according to the first resource. Every slot, the second terminal device detects on the feedback resource on the slot whether the initial feedback information exists. If the second terminal device detects the initial feedback information on the feedback resource in the current slot, the timer is stopped; if the second terminal device does not detect the initial feedback information on the feedback resource in the current slot, the timer is adjusted by a value 1 and the next slot is continued to be detected until the initial feedback information is detected; or if the initial feedback information is still not detected until the timer expires, the second terminal device determines that the initial feedback information is not received, and the timer is stopped.

In S440, information is fed back. The second terminal device determines whether to send the feedback information to the first terminal device according to the initial feedback information of the third terminal device. If the second terminal device determines to send the feedback information, the feedback information may be sent to the first terminal device through a second sidelink channel, where the second sidelink channel may be a PSCCH, a PSSCH or a PSFCH.

Optionally, the second terminal device sends the feedback information to the first terminal device, and may also send a second indication message to the first terminal device, where the second indication message is similar to the first indication message. The second indication message may also include at least one of following information: identification information of the second terminal device, identification information of the third terminal device, link identification information of a link between the second terminal device and the third terminal device, the group identification information, HARQ process information, S-CSI, S-CQI, path loss information of the link between the second terminal device and the third terminal device, S-RSRP and power indication information, which is not repeatedly described here for simplicity.

In the present embodiment, if the second terminal device receives the initial feedback information indicating that the third terminal device successfully receives the sidelink data, for example, the initial feedback information may be the ACK information, the second terminal device may not send the feedback information to the first terminal device, or may forward the ACK information to the first terminal device, or may send resource request information to the first terminal device, where the resource request information may be used for indicating that the third terminal device successfully receives the sidelink data, and may also be used for requesting the first terminal device to allocate a third resource to the second terminal device at the same time, where the third resource is used for transmitting other sidelink data to another terminal device by the second terminal device.

If the initial feedback information indicates that the third terminal device does not successfully receive the sidelink data, for example, the initial feedback information may be the NACK information, then the second terminal device may forward the NACK information to the first terminal device.

If the second terminal device does not receive the initial feedback information sent by the third terminal device, the second terminal device does not send the feedback information to the first terminal device, or the second terminal device may also send the feedback information to the first terminal device, where the feedback information indicates that the third terminal device does not successfully receive the sidelink data.

In S450, resource is allocated. The first terminal device determines whether to allocate the second resource to the second terminal device, where the second resource may be used for retransmitting the sidelink data to the third terminal device by the second terminal device.

Optionally, when the first terminal device receives the feedback information sent by the second terminal device, it may be determined whether to allocate the second resource to the second terminal device according to the feedback information. Specifically, if the feedback information indicates that the third terminal device does not successfully receive the sidelink data, for example, the feedback information is the NACK information, the first terminal device allocates the second resource to the second terminal device; or if the feedback information indicates that the third terminal device successfully receives the sidelink data, for example, the feedback information is the ACK information, or the feedback information is the resource request information, the first terminal device does not allocate the second resource to the second terminal device.

Optionally, if the first terminal device does not receive the feedback information sent by the second terminal device, the first terminal device may not allocate the second resource to the second terminal device. For example, if the second terminal device may not send the ACK information to the first terminal device when the second terminal device determines that the third terminal device successfully receives the sidelink data, then the first terminal device may determine that the third terminal device successfully receives the sidelink data when the feedback information sent by the second terminal device is not received, and the first terminal device does not allocate the second resource to the second terminal device. Or considering that in the case that the third terminal device fails to detect SCI, the feedback information is not sent either, it may be set that when the second terminal device determines that the third terminal device successfully receives the sidelink data, the ACK information is sent to the first terminal device, then when the first terminal device does not receive the feedback information sent by the second terminal device, or when a DTX state is determined by the first terminal device, the second resource is allocated to the second terminal device; or the first terminal device may further determine through other manner whether to allocate the second resource to the second terminal device, which is not limited by the embodiments of the present application.

It should be understood that, in the two embodiments corresponding to FIG. 6 and FIG. 7, the first terminal device may allocate the second resource to the second terminal device only in the case that the NACK information is received; while in the case that the first terminal device does not receive the feedback information, or in the case that the ACK information or the resource request information is received, the second resource is not allocated to the second terminal device. The first terminal device may determine through several manners whether the feedback information sent by the target terminal device is received, for example, it may be determined through the manner of configuring the feedback resource or through the manner of setting the timer at the first terminal device whether the feedback information sent by the target terminal device is received.

Optionally, as an embodiment, the first terminal device may determine through the manner of configuring the feedback resource whether the feedback information sent by the target terminal device is received. Specifically, the first terminal device detects the feedback information on a feedback resource, where the feedback resource is used for carrying the feedback information; and the first terminal device determines whether the feedback information is received according to the detection result.

It should be understood that it is illustrated as an example here that the first terminal device detects the feedback information sent by the second terminal device on the feedback resource. Specifically, the first terminal device and the second terminal device may determine the feedback resource through several manners. For example, the feedback resource may have a corresponding relationship with the first resource, and the second terminal device and the first terminal device determine the corresponding feedback resource according to the first resource, where the corresponding relationship may be pre-configuration, network device configuration or other terminal device configuration. For example, it may be configured by the first terminal device; or when the first terminal device configures the first resource for the second terminal device, the feedback resource is also configured for the second terminal device, which is not limited by the embodiments of the present application.

The first terminal device detects on the feedback resource whether the feedback information exists, and if the feedback information is not detected or a DTX state is detected, it is determined that the second terminal device does not send the feedback information.

Optionally, as an embodiment, the first terminal device may also determine through the manner of setting the timer whether the feedback information sent by the target terminal device is received. Specifically, when the first terminal device allocates the first resource to the second terminal device, the timer is started, and the timer starts timing. The timer may perform timing in any time unit, for example, timing may be performed in the unit of slot. Every slot, the first terminal device detects on the slot whether the feedback information exists. If the first terminal device detects the feedback information in the current slot, the timer is stopped, and the first terminal device may determine whether to allocate the second resource to the second terminal device according to the feedback information; if the first terminal device does not detect the feedback information in the current slot, the timer is adjusted by a value 1 and the next slot continues to be detected until the first terminal devices the feedback information; or if until the timer expires, the feedback information is still not detected, the first terminal device determines that the feedback information of the target terminal device is not received, and the timer is stopped.

Adjusting the timer by a value 1 includes increasing or decreasing by a value 1. For example, if the timer is a countdown timer, i.e. when the timer is started, the timer starts timing from the preset duration, then adjusting by a value 1 means reducing by a value 1, and when the timer is 0, the timer expires; and if the timer sequentially times, i.e. when the timer is started, the timer starts timing from 0, then adjusting by value 1 means reducing by a value 1, and when the count value of the timer reaches the duration of the timer, the timer expires.

Optionally, the duration of the timer may be set according to an actual application. For example, the duration of the timer is determined by the first terminal device according to pre-configuration, network device configuration, or attribute information of the sidelink data, where the attribute information may include at least one of following information: a delay requirement of the sidelink data, QoS of the sidelink data, a QCI, a VQI value and a priority of the sidelink data, which is not limited by the embodiments of the present application.

Optionally, the first terminal device may determine whether the feedback information is received combining the configuring the feedback resource and the timer. For example, when the first terminal device allocates the first resource to the second terminal device, the timer is started, and the timer starts timing. The first terminal device determines the feedback resource corresponding to the first resource according to the first resource. Every slot, the first terminal device detects on the feedback resource in the current slot whether the feedback information exists. If the first terminal device detects the feedback information on the feedback resource in the current slot, the timer is stopped; if the first terminal device does not detect the feedback information on the feedback resource in the current slot, the timer is adjusted by a value 1 and the next slot continues to be detected until the feedback information is detected; or if until the timer expires, the feedback information is still not detected, the first terminal device determines that the feedback information is not received, and the timer is stopped.

If the first terminal device determines that the feedback information is not received using the foregoing manner, the first terminal device allocates the second resource to the second terminal device. Or if the first terminal device receives the feedback information, the first terminal device determines whether to allocate the second resource to the second terminal device according to the feedback information. For example, if the feedback information indicates that the third terminal device does not successfully receive the sidelink data, for example, the feedback information may be the NACK information, the first terminal device allocates the second resource to the second terminal device; or if the feedback information indicates that the third terminal device successfully receives the sidelink data, for example, the feedback information may be the ACK information or the resource request information, the first terminal device does not allocate the second resource to the second terminal device. Or if the feedback information is the resource request information, the third resource is allocated to the second terminal device, where the third resource is used for performing sidelink communication between the second terminal device and another terminal device, and another terminal device may be any terminal device.

Therefore, in the method of resource allocation of the embodiments of the present application, the first terminal device allocates the first resource to the second terminal device; the second terminal device transmits the sidelink data to the third terminal device using the first resource; and the first terminal device may determine whether to allocate the second resource to the second terminal device according to the condition of receiving the sidelink data by the third terminal device, where the second resource is used for retransmitting the sidelink data to the third terminal device by the second terminal device, thereby achieving allocation of the retransmission resource of the sidelink data.

The method of resource allocation according to the embodiments of the present application is described hereinabove in detail from the perspective of the first terminal device allocating the transmission resource in conjunction with FIG. 1 to FIG. 7, and the method of resource allocation according to the embodiments of the present application will be described hereinafter from the perspective of other terminal devices in conjunction with FIG. 8 to FIG. 9.

Figure 8:
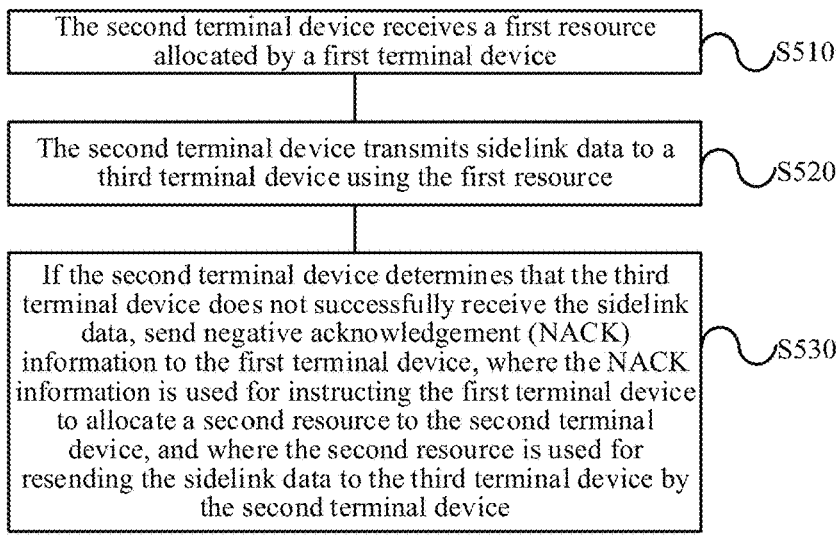
FIG. 8 is a schematic flow chart of another method of resource allocation provided by an embodiment of the present application.

FIG. 8 shows a schematic flow chart of a method 500 of resource allocation according to an embodiment of the present application. As shown in FIG. 8, the method 500 includes: S510, a second terminal device receiving a first resource allocated by a first terminal device; S520, the second terminal device transmitting sidelink data to a third terminal device using the first resource; S530, if the second terminal device determines that the third terminal device does not successfully receive the sidelink data, sending negative acknowledgement (NACK) information to the first terminal device, where the NACK information is used for instructing the first terminal device to allocate a second resource to the second terminal device.

Optionally, as an embodiment, the second resource is used for retransmitting the sidelink data to the third terminal device by the second terminal device.

Optionally, as an embodiment, the method 500 further includes: if the second terminal device determines that the third terminal device successfully receives the sidelink data, sending first information to the first terminal device, where the first information is used for determining by the first terminal device not to allocate the second resource to the second terminal device.

Optionally, the first information is used for determining by the first terminal device to allocate a third resource to the second terminal device.

Optionally, as an embodiment, the first information is acknowledgement (ACK) information, or the first information is resource request information.

The resource request information is used for requesting the first terminal device to allocate the third resource to the second terminal device; and the third resource is used for transmitting other sidelink data to another terminal device by the second terminal device.

Optionally, as an embodiment, the method 500 further includes: the second terminal device determining a feedback resource, where the feedback resource is used for carrying the feedback information, and the feedback information includes the NACK information or the ACK information.

Optionally, as an embodiment, the second terminal device determining the feedback resource, includes: the second terminal device determining the feedback resource corresponding to the first resource according to protocol provision, configuration information sent by a network device or configuration information sent by other terminal device.

Optionally, as an embodiment, the second terminal device determining the feedback resource, includes: the second terminal device receives the feedback resource allocated by the first terminal device.

Optionally, as an embodiment, the method 500 further includes: the second terminal device determining whether the third terminal device successfully receives the sidelink data.

Optionally, as an embodiment, the second terminal device determining whether the third terminal device successfully receives the sidelink data, includes: the second terminal device receiving initial feedback information sent by the third terminal device; the second terminal device determining whether the third terminal device successfully receives the sidelink data according to the initial feedback information.

Optionally, as an embodiment, the second terminal device determining whether the third terminal device successfully receives the sidelink data according to the initial feedback information, includes: if the initial feedback information is the ACK information, the second terminal device determines that the third terminal device successfully receives the sidelink data; or if the initial feedback information is the NACK information, the second terminal device determines that the third terminal device does not successfully receives the sidelink data.

Optionally, as an embodiment, the second terminal device receiving the initial feedback information sent by the third terminal device, includes: the second terminal device receiving through a third sidelink channel the initial feedback information sent by the third terminal device.

Optionally, as an embodiment, the third sidelink channel is: a PSCCH, a PSSCH or a PSFCH.

Optionally, as an embodiment, the sending the negative acknowledgement (NACK) information to the first terminal device, includes: the second terminal device sending the NACK information to the first terminal device through a second sidelink channel.

Optionally, as an embodiment, the method 500 further includes: the second terminal device sends a second indication message to the first terminal device, where the second indication message includes at least one of following information: identification information of the second terminal device, identification information of the third terminal device, link identification information of a link between the second terminal device and the third terminal device, group identification information, HARQ process information, S-CSI, S-CQI, path loss information of the link between the second terminal device and the third terminal device, S-RSRP and power indication information.

Optionally, as an embodiment, the second sidelink channel is: a PSCCH, a PSSCH or a PSFCH.

It should be understood that the first terminal device in the method 500 may correspond to the first terminal devices in the method 200, the method 300 and the method 400, the second terminal device in the method 500 may correspond to the second terminal devices in the method 200, the method 300 and the method 400, and the third terminal device in the method 500 may correspond to the third terminal devices in the method 200, the method 300 and the method 400, which is not repeatedly described here for simplicity.

Therefore, in the method of resource allocation of the embodiment of the present application, the first terminal device allocates the first resource to the second terminal device; the second terminal device transmits the sidelink data to the third terminal device using the first resource; and the first terminal device may determine whether to allocate the second resource to the second terminal device according to the condition of receiving the sidelink data by the third terminal device, where the second resource is used for retransmitting the sidelink data to the third terminal device by the second terminal device, thereby achieving allocation of the retransmission resource of the sidelink data.

Figure 9:
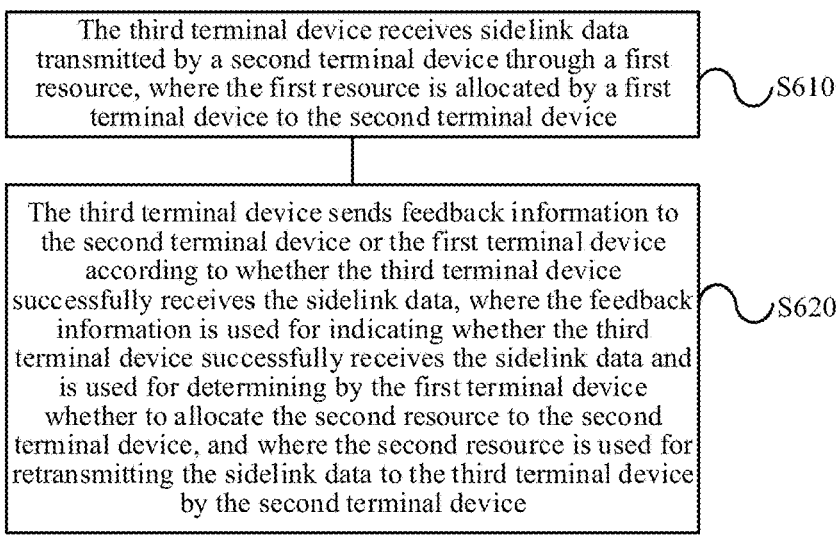
FIG. 9 is a schematic flow chart of another method of resource allocation provided by an embodiment of the present application.

FIG. 9 shows a schematic flow chart of a method 600 of resource allocation according to an embodiment of the present application. As shown in FIG. 9, the method 600 includes: S610, a third terminal device receiving sidelink data transmitted by a second terminal device through a first resource, where the first resource is allocated by a first terminal device to the second terminal device; S620, the third terminal device sending feedback information to the second terminal device or the first terminal device according to whether the third terminal device successfully receives the sidelink data, where the feedback information is used for indicating whether the third terminal device successfully receives the sidelink data and is used for determining by the first terminal device whether to allocate the second resource to the second terminal device.

Optionally, as an embodiment, the second resource is used for retransmitting the sidelink data to the third terminal device by the second terminal device.

Optionally, as an embodiment, if the third terminal device does not successfully receive the sidelink data, the feedback information is NACK information.

Optionally, as an embodiment, if the third terminal device successfully receives the sidelink data, the feedback information is ACK information.

Optionally, as an embodiment, the sending the feedback information to the second terminal device or the first terminal device, includes: the third terminal device sending the feedback information to the first terminal device through a first sidelink channel.

Optionally, as an embodiment, the method 600 further includes: the third terminal device sending a first indication message to the first terminal device, where the first indication message includes at least one of following information: identification information of third terminal device, identification information of the second terminal device, link identification information of a link between the second terminal device and the third terminal device, group identification information, HARQ process information, S-CSI, S-CQI, path loss information of the link between the second terminal device and the third terminal device, S-RSRP and power indication information.

Optionally, as an embodiment, the first sidelink channel is a PSCCH, a PSSCH or a PSFCH.

Optionally, as an embodiment, the sending the feedback information to the second terminal device or the first terminal device, includes: the third terminal device sending the feedback information to the second terminal device through a third sidelink channel.

Optionally, as an embodiment, the third sidelink channel is: a PSCCH, a PSSCH or a PSFCH.

It should be understood that the first terminal device in the method 600 may correspond to the first terminal devices in the method 200, the method 300 and the method 400, the second terminal device in the method 600 may correspond to the second terminal devices in the method 200, the method 300 and the method 400, and the third terminal device in the method 600 may correspond to the third terminal devices in the method 200, the method 300, and the method 400, which is not repeatedly described here for simplicity.

Therefore, in the method of resource allocation according to the embodiment of the present application, the first terminal device allocates the first resource to the second terminal device; the second terminal device transmits the sidelink data to the third terminal device using the first resource; and the first terminal device may determine whether to allocate the second resource to the second terminal device according to the condition of receiving the sidelink data by the third terminal device, where the second resource is used for retransmitting the sidelink data to the third terminal device by the second terminal device, thereby achieving allocation of the retransmission resource of the sidelink data.

It should be understood that in various embodiments of the present application, sizes of the sequence numbers of the foregoing processes do not indicate execution sequences. The execution sequence of each process should be determined according to a function and inherent logic thereof, and should not constitute any limit on the implementation process of the embodiments of the present application.

In addition, the term "and/or" herein is only to describe a kind of association relationship among associated objects, and means that there may be three kinds of relationships. For example, A and/or B, may mean that there are the following three cases: A exists alone, A and B exist at the same time, and B exists alone. In addition, the character "/" herein generally indicates that the associated objects before and after are in an "or" relationship.

The method of resource allocation according to the embodiments of the present application is described hereinabove in detail in conjunction with FIG. 1 to FIG. 9, and a terminal device according to the embodiments of the present application will be described hereinafter in conjunction with FIG. 10 to FIG. 13.

Figure 10:
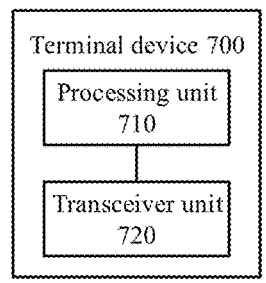
FIG. 10 is a schematic block diagram of a terminal device provided by an embodiment of the present application.

As shown in FIG. 10, a terminal device 700 according to an embodiment of the present application includes: a processing unit 710 and a transceiver unit 720. Optionally, the terminal device 700 may be a first terminal device 700, where the first terminal device 700 may be the first terminal device which performs the method 200 to the method 600 in the embodiments of the present application. Specifically, the processing unit 710 is configured to: allocate a first resource to a second terminal device, where the first resource is used for transmitting sidelink data to a third terminal device by the second terminal device; determine whether feedback information sent by a target terminal device is received by the transceiver unit 720, where the target terminal device is the second terminal device and/or the third terminal device, and where the feedback information is used for indicating whether the third terminal device successfully receives the sidelink data; and determine whether to allocate a second resource to the second terminal device according to whether the feedback information is received by the transceiver unit 720, where the second resource is used for retransmitting the sidelink data to the third terminal device by the second terminal device.

Optionally, as an embodiment, the target device is the third terminal device.

Optionally, as an embodiment, the transceiver unit 720 is configured to: receive through a first sidelink channel the feedback information sent by the third terminal device.

Optionally, as an embodiment, the transceiver unit 720 is further configured to: receive a first indication message sent by the third terminal device, where the first indication message includes at least one of following information: identification information of the third terminal device, identification information of the second terminal device, link identification information of a link between the second terminal device and the third terminal device, group identification information, HARQ process information, S-CSI, S-CQI, path loss information of the link between the second terminal device and the third terminal device, S-RSRP and power indication information.

Optionally, as an embodiment, the first sidelink channel is a PSCCH, a PSSCH or a PSFCH.

Optionally, as an embodiment, the target terminal device is the second terminal device.

Optionally, as an embodiment, the feedback information is determined by the second terminal device according to initial feedback information sent by the third terminal device, where the initial feedback information is used for indicating whether the third terminal device successfully receives the sidelink data.

Optionally, as an embodiment, the transceiver unit 720 is configured to: receive through a second sidelink channel the feedback information sent by the second terminal device.

Optionally, as an embodiment, the transceiver unit 720 is further configured to: receive a second indication message sent by the second terminal device, where the second indication message includes at least one of following information: identification information of the second terminal device, identification information of the third terminal device, link identification information of a link between the second terminal device and the third terminal device, group identification information, HARQ process information, S-CSI, S-CQI, path loss information of the link between the second terminal device and the third terminal device, S-RSRP and power indication information.

Optionally, as an embodiment, the second sidelink channel is a PSCCH, a PSSCH or a PSFCH.

Optionally, as an embodiment, the processing unit 710 is configured to: if the transceiver unit 720 receives the feedback information, determine whether to allocate the second resource to the second terminal device according to the feedback information; or if the transceiver unit 720 does not receive the feedback information, not allocate the second resource to the second terminal device.

Optionally, as an embodiment, the processing unit 710 is configured to: detect the feedback information on a feedback resource, where the feedback resource is used for carrying the feedback information; and determine whether the feedback information is received according to the detection result.

Optionally, as an embodiment, the feedback resource is corresponding to the first resource.

Optionally, as an embodiment, the processing unit 710 is further configured to: allocate the feedback resource to the second terminal device.

Optionally, as an embodiment, the first terminal device 700 is provided with a timer, and the processing unit 710 is configured to: determine whether the feedback information sent by the target terminal device is received according to the timer.

Optionally, the processing unit 710 is configured to: when the first resource is allocated to the second terminal device, start the timer.

Optionally, the processing unit 710 is configured to: after the timer is started, detect the feedback information in each subsequent slot; and adjust the timer according to the detection result, and determine whether the feedback information sent by the target terminal device is received.

Optionally, the processing unit 710 is configured to: before the timer expires, if the feedback information is not detected on a current slot, adjust the timer by a value 1; or before the timer expires, if the feedback information is detected on the current slot, stop the timer.

Optionally, the processing unit 710 is configured to: if the feedback information is not detected when the timer expires, stop the timer, and determine that the feedback information sent by the target terminal device is not received.

Optionally, duration of the timer is determined by the first terminal device 700 according to pre-configuration, network device configuration or attribute information of the sidelink data, where the attribute information includes at least one of following information: a delay requirement of the sidelink data, quality of service (QoS) of the sidelink data, a QoS class identifier (QCI), a vehicle to everything 5G QoS identifier (VQI) value and a priority of the sidelink data.

Optionally, as an embodiment, the transceiver unit 720 is configured to: receive resource request information sent by the second terminal device, and determine the resource request information as the feedback information, where the feedback information is used for indicating that the third terminal device successfully receives the sidelink data, the resource request information is used for requesting the first terminal device 700 to allocate a third resource to the second terminal device, and the third resource is used for transmitting other sidelink data to another terminal device by the second terminal device.

Optionally, as an embodiment, the processing unit 710 is configured to: if the transceiver unit 720 receives the feedback information, determine whether to allocate the second resource to the second terminal device according to the feedback information; or if the transceiver unit 720 does not receive the feedback information, allocate the second resource to the second terminal device.

Optionally, as an embodiment, the processing unit 710 is configured to: if the feedback information indicates that the third terminal device does not successfully receives the sidelink data, allocate the second resource to the second terminal device; or if the feedback information indicates that the third terminal device successfully receives the sidelink data, not allocate the second resource to the second terminal device.

Optionally, as an embodiment, if the feedback information is acknowledgement (ACK) information, the feedback information indicates that the third terminal device successfully receives the sidelink data; and if the feedback information is negative acknowledgement (NACK) information, the feedback information indicates that the third terminal device does not successfully receives the sidelink data.

It should be understood that the first terminal device 700 according to the embodiment of the present application may perform the method 200 to the method 600 in the embodiments of the present application, and the foregoing and other operation and/or function of each unit in the first terminal device 700 are for implementing the corresponding processes of the first terminal device in each method in FIG. 1 to FIG. 9 respectively, which is not repeatedly described here for simplicity.

Optionally, the terminal device 700 may also be a second terminal device 700, and the second terminal device 700 may be the second terminal device which performs the method 200 to the method 600 in the embodiments of the present application. Specifically, the transceiver unit 720 is configured to: receive the first resource allocated by the first terminal device; the processing unit 710 is configured to: transmit the sidelink data to the third terminal device using the first resource; and the transceiver unit 720 is further configured to: if the processing unit 710 determines that the third terminal device does not successfully receives the sidelink data, send the negative acknowledgement (NACK) information to the first terminal device, where the NACK information is used for instructing the first terminal device to allocate the second resource to the second terminal device 700.

Optionally, as an embodiment, the second resource is used for retransmitting the sidelink data to the third terminal device by the second terminal device 700.

Optionally, as an embodiment, the transceiver unit 720 is configured to: if the processing unit 710 determines that the third terminal device successfully receives the sidelink data, send first information to the first terminal device, where the first information is used for determining by the first terminal device not to allocate the second resource to the second terminal device 700.

Optionally, the first information is used for determining by the first terminal device to allocate the third resource to the second terminal device.

Optionally, as an embodiment, the first information is the acknowledgement (ACK) information or the resource request information.

The resource request information is used for requesting the first terminal device to allocate the third resource to the second terminal device 700, where the third resource is used for transmitting other sidelink data to another terminal device by the second terminal device 700.

Optionally, as an embodiment, the processing unit 710 is configured to: determine the feedback resource, where the feedback resource is used for carrying the feedback information, and the feedback information includes the NACK information or the ACK information.

Optionally, as an embodiment, the processing unit 710 is configured to: determine the feedback resource corresponding to the first resource according to protocol provision, configuration information sent by the network device or configuration information sent by other terminal device.

Optionally, as an embodiment, the transceiver unit 720 is further configured to: receive the feedback resource allocated by the first terminal device.

Optionally, as an embodiment, the processing unit 710 is configured to: determine whether the third terminal device successfully receives the sidelink data.

Optionally, as an embodiment, the transceiver unit 720 is configured to: receive initial feedback information sent by the third terminal device; and the processing unit 710 is configured to: determine whether the third terminal device successfully receives the sidelink data according to the initial feedback information.

Optionally, as an embodiment, the processing unit 710 is configured to: if the initial feedback information is the ACK information, determine that the third terminal device successfully receives the sidelink data; or if the initial feedback information is the NACK information, determine that the third terminal device does not successfully receive the sidelink data.

Optionally, as an embodiment, the transceiver unit 720 is configured to: receive through a third sidelink channel the initial feedback information sent by the third terminal device.

Optionally, as an embodiment, the third sidelink channel is: a PSCCH, a PSSCH, or a PSFCH.

Optionally, as an embodiment, the transceiver unit 720 is configured to: send the NACK information to the first terminal device through a second sidelink channel.

Optionally, as an embodiment, the transceiver unit 720 is configured to: send the second indication message to the first terminal device, where the second indication message includes at least one of following information: identification information of the second terminal device 700, identification information of the third terminal device, link identification information of a link between the second terminal device 700 and third terminal device, group identification information, HARQ process information, S-CSI, S-CQI, path loss information of the second terminal device, S-RSRP and power indication information.

Optionally, as an embodiment, the second sidelink channel is: a PSCCH, a PSSCH or a PSFCH.

It should be understood that the second terminal device 700 according to the embodiments of the present application may perform the method 200 to the method 600 in the embodiments of the present application, and the foregoing and other operation and/or function of each unit in the second terminal device 700 are for implementing the corresponding processes of the second terminal device in each method in FIG. 1 to FIG. 9 respectively, which is not repeatedly described here for simplicity.

Optionally, the terminal device 700 may also be a third terminal device 700, and the third terminal device 700 may be the third terminal device which performs the method 200 to the method 600 in the embodiments of the present application. Specifically, the transceiver unit 720 is configured to: receive the sidelink data transmitted by the second terminal device through the first resource, where the first resource is allocated by the first terminal device to the second terminal device; send the feedback information to the second terminal device or the first terminal device according to whether the sidelink data is successfully received which is determined by the processing unit 710, where the feedback information is used for indicating whether the third terminal device 700 successfully receives the sidelink data and is used for determining by the first terminal device whether to allocate the second resource to the second terminal device.

Optionally, as an embodiment, the second resource is used for retransmitting the sidelink data to the third terminal device 700 by the second terminal device.

Optionally, as an embodiment, if the third terminal device 700 does not successfully receive the sidelink data, the feedback information is the negative acknowledgement (NACK) information.

Optionally, as an embodiment, if the third terminal device 700 successfully receives the sidelink data, the feedback information is the acknowledgement (ACK) information.

Optionally, as an embodiment, the transceiver unit 720 is configured to: send the feedback information to the first terminal device through the first sidelink channel.

Optionally, as an embodiment, the transceiver unit 720 is configured to: send the first indication message to the first terminal device, where the first indication message includes at least one of following information: identification information of the third terminal device 700, identification information of the second terminal device, link identification information of a link between the second terminal device and third terminal device 700, group identification information, HARQ process information, S-CSI, S-CQI, path loss information of the link between the second terminal device and the third terminal device, S-RSRP and power indication information.

Optionally, as an embodiment, the first sidelink channel is a PSCCH, a PSSCH or a PSFCH.

Optionally, as an embodiment, the transceiver unit 720 is configured to: send the feedback information to the second terminal device through the third sidelink channel.

Optionally, as an embodiment, the third sidelink channel is: a PSCCH, a PSSCH or a PSFCH.

It should be understood that the third terminal device 700 according to the embodiment of the present application may perform the method 200 to the method 600 in the embodiments of the present application, and the foregoing and other operation and/or function of each unit in the third terminal device 700 are for implementing the corresponding processes of the third terminal device in each method in FIG. 1 to FIG. 9 respectively, which is not repeatedly described here for simplicity.

Therefore, in the terminal devices of the embodiments of the present application, the first terminal device allocates the first resource to the second terminal device, the second terminal device transmits the sidelink data to the third terminal device using the first resource, and the first terminal device may determine whether to allocate the second resource to the second terminal device according to the condition of receiving the sidelink data by the third terminal device, where the second resource is used for retransmitting the sidelink data to the third terminal device by the second terminal device, thereby allocation of the retransmission resource of the sidelink data is achieved.

Figure 11:
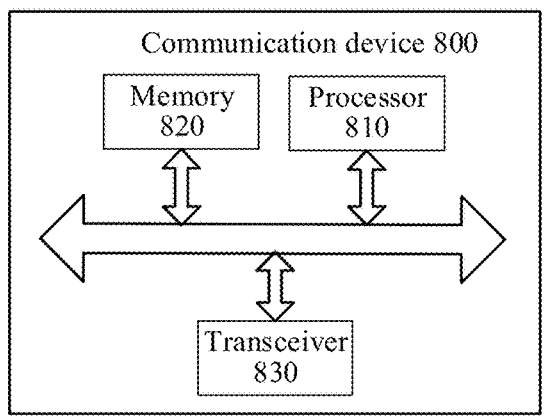
FIG. 11 is a schematic block diagram of a communication device provided by an embodiment of the present application.

FIG. 11 is a schematic structural diagram of a communication device 800 provided by an embodiment of the present application. The communication device 800 shown in FIG. 11 includes a processor 810, where the processor 810 may call and run a computer program from a memory to implement the methods in the embodiments of the present application.

Optionally, as shown in FIG. 11, the communication device 800 may further include a memory 820. The processor 810 may call and run the computer program from the memory 820 to implement the methods in the embodiments of the present application.

The memory 820 may be one individual device independent of the processor 810, or may be integrated into the processor 810.

Optionally, as shown in FIG. 11, the communication device 800 may further include a transceiver 830, and the processor 810 may control the transceiver 830 to communicate with other device. Specifically, information or data may be sent to or received from other device.

The transceiver 830 may include a transmitter and a receiver. The transceiver 830 may further include an antenna, and the number of antennas may be one or more.

Optionally, the communication device 800 may specifically be the network device of the embodiments of the present application, and the communication device 800 may implement the corresponding processes implemented by the network device in each method of the embodiments of the present application, which is not repeatedly described here for simplicity.

Optionally, the communication device 800 may specifically be the mobile terminal/terminal device of the embodiments of the present application, and the communication device 800 may implement the corresponding processes implemented by the mobile terminal/terminal device in each method of the embodiments of the present application, which is not repeatedly described here for simplicity.

Figure 12:
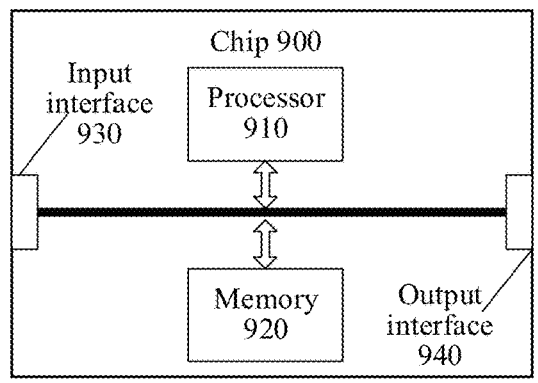
FIG. 12 is a schematic block diagram of a chip provided by an embodiment of the present application.

FIG. 12 is a schematic structural diagram of a chip of an embodiment of the present application. The chip 900 shown in FIG. 12 includes a processor 910, and the processor 910 may call and run a computer program from a memory to implement the methods in the embodiments of the present application.

Optionally, as shown in FIG. 12, the chip 900 may further include a memory 920. The processor 910 may call and run the computer program from the memory 920 to implement the methods in the embodiments of the present application.

The memory 920 may be one individual device independent of the processor 910, or may be integrated into the processor 910.

Optionally, the chip 900 may further include an input interface 930. The processor 910 may control the input interface 930 to communicate with other device or chip. Specifically, information or data sent by other device or chip may be obtained.

Optionally, the chip 900 may further include an output interface 940. The processor 910 may control the output interface 940 to communicate with other device or chip. Specifically, information or data may be output to other device or chip.

Optionally, the chip is applicable to the network device in the embodiments of the present application, and the chip may implement the corresponding processes implemented by the network device in each method of the embodiments of the present application, which is not repeatedly described here for simplicity.

Optionally, the chip is applicable to the mobile terminal/terminal device in the embodiments of the present application, and the chip may implement the corresponding processes implemented by the mobile terminal/terminal device in each method of the embodiments of the present application, which is not repeatedly described here for simplicity.

It should be understood that the chip mentioned in embodiments of the present application may also be referred to as a system-level chip, a system chip, a chip system or a system-on-chip, etc.

Figure 13:
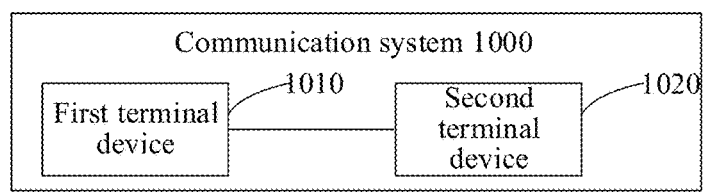
FIG. 13 is a schematic diagram of a communication system provided by an embodiment of the present application.

FIG. 13 is a schematic block diagram of a communication system 1000 provided by an embodiment of the present application. As shown in FIG. 13, the communication system 1000 includes a first terminal device 1010 and a second device 1020.

The first terminal device 1010 and the second device 1020 may be any two terminal devices among the first terminal device, the second terminal device, and the third terminal device in the foregoing methods, which is not repeatedly described here for simplicity.

For example, the first terminal device 1010 may be configured to realize the corresponding functions realized by the second terminal device in the foregoing methods, and the second device 1020 may be configured to realize the corresponding functions realized by the third device in the foregoing methods, which is not limited by the embodiments of the present application.

It should be understood that the processor of the embodiments of the present application may be a type of integrated circuit chip, with a signal processing capability. In the realization process, each step of the foregoing method embodiments may be completed through integrated logic circuits of hardware or instructions in the form of software in the processor. The foregoing processor may be a general-purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components. Each method, step and logic block diagram disclosed in the embodiments of the present application may be realized or performed. The general-purpose processor may be a microprocessor, or the processor may also be any conventional processor, etc. The steps of the methods disclosed in combination with the embodiments of the present application may be directly completed by a hardware decoding processor, or completed by a combination of hardware and a software module in the decoding processor. The software module may be located in other mature storage medium in the field such as a random access memory, a flash memory, a read-only memory, a programmable ROM or an electrically EPROM, a register or the like. The storage medium is located in the memory, and the processor reads information in a memory so as to complete the steps of the aforementioned methods in conjunction with its hardware.

It may be understood that the memory in the embodiments of the present application may be a volatile memory or a non-volatile memory, or may include both a volatile memory and a non-volatile memory. The nonvolatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM), and it is used as an external cache. Through exemplary but not limitative illustration, many forms of RAM are available, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memory of the systems and methods described herein is intended to include, but not limited to, these and any other suitable types of memories.

It should be understood that the foregoing memories are exemplary but not limitative illustration. For example, the memory in the embodiments of the present application may also be a static RAM (SRAM), a dynamic RAM (DRAM), a synchronous DRAM (SDRAM), a double data rate SDRAM (DDR SDRAM), an enhanced SDRAM (enhanced SDRAM), a synch link DRAM (SLDRAM) and a Direct Rambus RAM (DR RAM), etc. That is, the memory in the embodiments of the present application is intended to include, but not limited to, these and any other suitable types of memories.

The embodiments of the present application also provide a computer-readable storage medium for storing a computer program.

Optionally, the computer-readable storage medium is applicable to the network device in the embodiments of the present application, and the computer program causes a computer to perform the corresponding processes implemented by the network device in each method of the embodiments of the present application, which is not repeatedly described here for simplicity.

Optionally, the computer-readable storage medium is applicable to the mobile terminal/terminal device in the embodiments of the present application, and the computer program causes a computer to perform the corresponding processes implemented by the mobile terminal/terminal device in each method of the embodiments of the present application, which is not repeatedly described here for simplicity.

The embodiments of the present application also provide a computer program product, including a computer program instruction.

Optionally, the computer program product is applicable to the network device in the embodiments of the present application, and the computer program instruction causes a computer to perform the corresponding processes implemented by the network device in each method of the embodiments of the present application, which is not repeatedly described here for simplicity.

Optionally, the computer program product is applicable to the mobile terminal/terminal device in the embodiments of the present application, and the computer program instruction causes a computer to perform the corresponding processes implemented by the mobile terminal/terminal device in each method of the embodiments of the present application, which is not repeatedly here for simplicity.

The embodiments of the present application also provide a computer program.

Optionally, the computer program is applicable to the network device in the embodiments of the present application. When the computer program is run on a computer, the computer is caused to perform the corresponding processes implemented by the network device in each method of the embodiments of the present application, which is not repeatedly described here for simplicity.

Optionally, the computer program is applicable to the mobile terminal/terminal device in the embodiments of the present application. When the computer program is run on a computer, the computer is caused to perform the corresponding processes implemented by the mobile terminal/terminal device in each method of the embodiments of the present application, which is not repeatedly described here for simplicity.

Those of ordinary skilled in the art may realize that the unit and algorithm step of each example described in conjunction with the embodiments disclosed herein can be implemented with electronic hardware, or a combination of computer software and electronic hardware. Whether these functions are performed by hardware or software depends on the specific application and design constraint of the technical solution. Professionals may use a different method to realize the described function for each specific application, but such realization should not be considered beyond the scope of the present application.

Those of skilled in the art may clearly understand that for the convenience and simplicity of the description, for the specific working process of the systems, apparatuses and units described above, the corresponding process in the foregoing method embodiments may be referred to, which is not be repeatedly here.

In several embodiments provided by the present application, it should be understood that the system, apparatus and method disclosed may be implemented in other way. For example, the apparatus embodiments described above are merely schematic. For example, said division of the units is only a type of logical function division, and there may be other division way in actual implementation, for example, a plurality of units or components may be combined or integrated into another system, or some features may be ignored or not performed. On the other hand, a mutual coupling, a direct coupling or a communication connection displayed or discussed may be an indirect coupling or a communication connection through some interfaces, apparatuses or units, and may be electrical, mechanical or in other form.

The unit illustrated as a separate component may or may not be physically separate, and a component displayed as a unit may or may not be a physical unit, i.e. it may be located in one place or may also be distributed onto a plurality of network units. Some or all of the units may be selected according to the actual need to achieve the objective of the solution of the present embodiments.

In addition, each functional unit in each embodiment of the present application may be integrated into one processing unit, or it may be that each unit exists alone physically, or it may be that two or more units are integrated into one unit.

The function may also be stored in a computer-readable storage medium if being realized in the form of a software functional unit and sold or used as an independent product. Based on such understanding, the essence of the technical solution of the present application or the part contributing to the related art or part of the technical solution may be embodied in the form of a software product, and the computer software product is stored in a storage medium including several instructions such that a computer device (which may be a personal computer, a server, or a network device, etc.) executes all or part of the steps of the method described in each embodiment of the present application. The aforementioned storage medium includes a U disk, a mobile hard disk, a Read-Only Memory (ROM), a Random Access Memory (RAM), a magnetic disk or an optical disk and other mediums that can store program codes.

The foregoing descriptions are merely specific implementations of the embodiments of the present application, and the protection scope of the embodiments of the present application is not limited thereto. Any person skilled in the art can easily think of changes or substitutions within the technical scope disclosed in the present application, and all the changes or substitutions should be covered in the protection scope of the present application. Therefore, the protection scope of the present application should be subject to the protection scope of the claims.

What is claimed is:

1. A method of resource allocation, comprising:
    allocating, by a first terminal device, a first resource to a second terminal device, wherein the first resource is used for transmitting sidelink data to a third terminal device by the second terminal device;
    determining, by the first terminal device, whether feedback information sent by a target terminal device is received, wherein the target terminal device is the second terminal device and/or the third terminal device, and wherein the feedback information is used for indicating whether the third terminal device successfully receives the sidelink data; and determining, by the first terminal device, whether to allocate a second resource to the second terminal device according to whether the feedback information is received, wherein the second resource is used for retransmitting the sidelink data to the third terminal device by the second terminal device.

2. The method according to claim 1, wherein the target terminal device is the third terminal device.

3. The method according to claim 2, wherein the method further comprises:
receiving, by the first terminal device, a first indication message sent by the third terminal device, wherein the first indication message comprises at least one of following information:
identification information of the third terminal device, identification information of the second terminal device, link identification information of a link between the second terminal device and the third terminal device, group identification information, Hybrid Automatic Repeat reQuest (HARQ) process information, sidelink channel state information (S-CSI), sidelink channel quality indication (S-CQI), path loss information of the link between the second terminal device and the third terminal device, sidelink reference signal received power (S-RSRP) information and power indication information.

4. The method according to claim 1, wherein the target terminal device is the second terminal device.

5. The method according to claim 4, wherein the feedback information is determined by the second terminal device according to initial feedback information sent by the third terminal device, and the initial feedback information is used for indicating whether the third terminal device successfully receives the sidelink data.

6. The method according to claim 4, wherein the method further comprises:
receiving, by the first terminal device, a second indication message sent by the second terminal device, wherein the second indication message comprises at least one of following information:
identification information of the second terminal device, identification information of the third terminal device, link identification information of a link between the second terminal device and the third terminal device, group identification information, Hybrid Automatic Repeat reQuest (HARQ) process information, sidelink channel state information (S-CSI), sidelink channel quality indication (S-CQI), path loss information of the link between the second terminal device and the third terminal device, sidelink reference signal received power (S-RSRP) information and power indication information.

7. The method according to claim 1, wherein the first terminal device comprises a timer, and determining, by the first terminal device, whether the feedback information sent by the target terminal device is received, comprises:
determining, by the first terminal device, whether the feedback information sent by the target terminal device is received according to the timer.

8. The method according to claim 7, wherein the method further comprises:
starting the timer, when the first terminal device allocates the first resource to the second terminal device.

9. The method according to claim 8, wherein determining, by the first terminal device, whether the feedback information sent by the target terminal device is received according to the timer, comprises:

detecting, by the first terminal device, the feedback information in each slot after starting the timer; and
adjusting, by the first terminal device, the timer according to a detection result, and determining, by the first terminal device, whether the feedback information sent by the target terminal device is received according to the detection result,
wherein adjusting, by the first terminal device, the timer according to the detection result, comprises:
adjusting, by the first terminal device, the timer by a value 1 when the feedback information is not detected by the first terminal device on a current slot before the timer expires; or
stopping, by first terminal device, the timer when the feedback information is detected by the first terminal device on the current slot before the timer expires,
wherein determining, by the first terminal device, whether the feedback information sent by the target terminal device is received according to the detection result, comprises:
determining, by the first terminal device, that the feedback information sent by the target terminal device is not received when the timer expires.

10. The method according to claim 7, wherein duration of the timer is determined by the first terminal device according to pre-configuration, network device configuration or attribute information of the sidelink data, and wherein the attribute information comprises at least one of following information: a delay requirement of the sidelink data, quality of service (QoS) of the sidelink data, a QoS class identifier (QCI), a vehicle to everything 5G QoS identifier (VQI) value and a priority of the sidelink data.

11. A terminal device, comprising:
a processor; and
a memory,
wherein the memory is configured to store a computer program, and wherein the processor is configured to call and run the computer program stored in the memory so as to:
allocate a first resource to a second terminal device, wherein the first resource is used for transmitting sidelink data to a third terminal device by the second terminal device;
determine whether feedback information sent by a target terminal device is received by the terminal device, wherein the target terminal device is the second terminal device and/or the third terminal device, and wherein the feedback information is used for indicating whether the third terminal device successful receives the sidelink data; and
determine whether to allocate a second resource to the second terminal device according to whether the feedback information is received by the terminal device, wherein the second resource is used for retransmitting the sidelink data to the third terminal device by the second terminal device.

12. The terminal device according to claim 11, wherein the target terminal device is the third terminal device.

13. The terminal device according to claim 12, wherein the processor is further configured to:
receive a first indication message sent by the third terminal device, wherein the first indication message comprises at least one of following information:
identification information of the third terminal device, identification information of the second terminal device, link identification information of a link between the second terminal device and the third terminal device, group identification information, Hybrid Automatic Repeat reQuest (HARQ) process information, sidelink channel state information (S-CSI), sidelink channel quality indication (S-CQI), path loss information of the link between the second terminal device and the third terminal device, sidelink reference signal received power (S-RSRP) information and power indication information.

14. The terminal device according to claim 11, wherein the target terminal device is the second terminal device.

15. The terminal device according to claim 14, wherein the feedback information is determined by the second terminal device according to initial feedback information sent by the third terminal device, and the initial feedback information is used for indicating whether the third terminal device successfully receives the sidelink data.

16. The terminal device according to claim 15, wherein the processor is further configured to:
receive a second indication message sent by the second terminal device, wherein the second indication message comprises at least one of following information:
identification information of the second terminal device, identification information of the third terminal device, link identification information of a link between the second terminal device and the third terminal device, group identification information, Hybrid Automatic Repeat reQuest (HARQ) process information, sidelink channel state information (S-CSI), sidelink channel quality indication (S-CQI), path loss information of the link between the second terminal device and the third terminal device, sidelink reference signal received power (S-RSRP) information and power indication information.

17. The terminal device according to claim 14, wherein the terminal device is provided with a timer, and the processor is further configured to:
determine whether the feedback information sent by the target terminal device is received according to the timer.

18. The terminal device according to claim 17, wherein the processor is further configured to:
start the timer when allocating the first resource to the second terminal device.

19. The terminal device according to claim 18, wherein the processor is further configured to:
detect the feedback information in each slot after starting the timer; and
adjust the timer and determine whether the feedback information sent by the target terminal device is received according to a detection result,
wherein the processor is further configured to:
adjust the timer by a value 1 when the feedback information is not detected on a current slot before the timer expires; or
stop the timer when the feedback information is detected on the current slot before the timer expires,
wherein the processor is further configured to:
determine that the feedback information sent by the target terminal device is not received when the timer expires.

20. The terminal device according to claim 17, wherein duration of the timer is determined by the terminal device according to pre-configuration, network device configuration or attribute information of the sidelink data, and wherein the attribute information comprises at least one of following information: a delay requirement of the sidelink data, quality of service (QoS) of the sidelink data, a QoS class identifier (QCI), a vehicle to everything 5G QoS identifier (VQI) value and a priority of the sidelink data.

* * * * *